United States Patent
Itagaki et al.

(10) Patent No.: US 8,984,351 B2
(45) Date of Patent: Mar. 17, 2015

(54) PERFORMING PROCESS FOR REMOVAL MEDIUM

(75) Inventors: Hiroshi Itagaki, Yamato (JP); Yutaka Oishi, Yamato (JP); Kazuhiro Ozeki, Yamato (JP); Katsumi Yoshimura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 13/556,750

(22) Filed: Jul. 24, 2012

(65) Prior Publication Data

US 2013/0031427 A1 Jan. 31, 2013

(30) Foreign Application Priority Data

Jul. 29, 2011 (JP) ................................. 2011-167267

(51) Int. Cl.
  G06F 11/00 (2006.01)
  G06F 11/07 (2006.01)
  G11B 20/18 (2006.01)
  G11B 27/36 (2006.01)

(52) U.S. Cl.
  CPC .......... *G06F 11/0727* (2013.01); *G06F 11/076* (2013.01); *G06F 11/079* (2013.01); *G11B 20/1816* (2013.01); *G11B 27/36* (2013.01); *G11B 2220/90* (2013.01)
  USPC ......................................................... 714/48

(58) Field of Classification Search
  USPC ................................................. 714/162, 48
  See application file for complete search history.

(56) References Cited

U.S. PATENT DOCUMENTS

| 6,236,626 | B1 | 5/2001 | Nagai |
| 7,409,442 | B2* | 8/2008 | Basham et al. ............... 709/223 |
| 7,779,110 | B2* | 8/2010 | Basham et al. ............... 709/223 |
| 7,809,990 | B2 | 10/2010 | Sasaki |
| 2006/0036786 | A1* | 2/2006 | Kreiner et al. ................... 710/62 |
| 2007/0226336 | A1* | 9/2007 | Katagiri et al. ............... 709/224 |
| 2010/0091626 | A1* | 4/2010 | Kubo ........................... 369/53.2 |

FOREIGN PATENT DOCUMENTS

| JP | 11-224450 | 8/1999 |
| JP | 2006-164445 | 6/2006 |

* cited by examiner

*Primary Examiner* — Amine Riad
(74) *Attorney, Agent, or Firm* — Stephen R. Tkacs; Stephen J. Walder, Jr.; Randall J. Bluestone

(57) ABSTRACT

In a controller of a tape drive, when an error recovery section cannot recover an error detected by an error detecting section, an error-report generation section generates an error report, an error-information acquisition section acquires error information of the tape drive and a cartridge loaded in the tape drive, an error-information exchange section acquires pieces of error information of other tape drives and cartridges loaded in these other tape drives, an error-factor judging section judges whether the error is attributable to the tape drive or the cartridge based on these pieces of error information, an error-report update section updates the error report in accordance with the result of this judgment, and an error-report output section outputs the error report thus updated to a host.

22 Claims, 7 Drawing Sheets

| PRESENT SITUATION OF DRIVE Da | | | | | | |
|---|---|---|---|---|---|---|
| | NUMBER OF ERRORS | | NUMBER OF DATA SETS | | NUMBER OF DATA SETS BETWEEN ERRORS | |
| CARTRIDGE | Read | Write | Read | Write | Read | Write |
| Ca | 1 | 2 | 43 | 2100 | 21.5 | 700 |

FIG. 1A

| DRIVE ERROR INFORMATION OF DRIVE Da | | | | | | |
|---|---|---|---|---|---|---|
| | NUMBER OF ERRORS | | NUMBER OF DATA SETS | | NUMBER OF DATA SETS BETWEEN ERRORS | |
| CARTRIDGE | Read | Write | Read | Write | Read | Write |
| Cd | 0 | 8 | 122046 | 0 | 122046 | 0 |
| Ca | 0 | 1 | 42 | 14982 | 42 | 1664.667 |
| Cf | 5 | 5 | 25 | 76497 | 25 | 38248.5 |
| Ce | 0 | 0 | 144 | 29252 | 24 | 4875.333 |
| Cg | 0 | 0 | 16 | 409 | 16 | 409 |
| Ch | 0 | 0 | 48 | 6966 | 48 | 6966 |
| Cd | 0 | 0 | 562 | 0 | 562 | 0 |
| Ci | 0 | 0 | 4 | 231 | 4 | 231 |
| Cc | 0 | 8 | 43 | 88375 | 43 | 9819.444 |
| Cb | 0 | 0 | 50 | 10975 | 50 | 10975 |
| TOTAL | 5 | 22 | 122980 | 227687 | 20496.67 | 9899.435 |

FIG. 1B

| CARTRIDGE ERROR INFORMATION OF CARTRIDGE Ca | | | | | | |
|---|---|---|---|---|---|---|
| | NUMBER OF ERRORS | | NUMBER OF DATA SETS | | NUMBER OF DATA SETS BETWEEN ERRORS | |
| DRIVE | Read | Write | Read | Write | Read | Write |
| Db | 3 | 0 | 276 | 0 | 69 | 0 |
| Dc | 0 | 0 | 268 | 3 | 268 | 3 |
| Db | 0 | 0 | 272 | 23997 | 272 | 23997 |
| Dc | 0 | 1 | 271 | 96580 | 271 | 48290 |
| Dc | 0 | 0 | 411 | 7692 | 411 | 7692 |
| Db | 0 | 0 | 266 | 12429 | 266 | 12429 |
| Db | 0 | 0 | 273 | 12418 | 273 | 12418 |
| Db | 0 | 3 | 267 | 120779 | 267 | 30194.75 |
| Db | 0 | 0 | 264 | 24264 | 264 | 24264 |
| Db | 0 | 0 | 266 | 59137 | 266 | 59137 |
| TOTAL | 3 | 4 | 2834 | 357299 | 708.5 | 71459.8 |

FIG. 1C

| DRIVE | NUMBER OF WRITTEN DATA SETS BETWEEN ERRORS |
|---|---|
| Da | 9899.435 |
| Db | 19873.211 |
| Dc | 18783.011 |

FIG. 2A

| CARTRIDGE | NUMBER OF WRITTEN DATA SETS BETWEEN ERRORS |
|---|---|
| Ca | 71459.8 |
| Cb | 68364.3 |
| Cc | 73321.3 |

FIG. 2B

PERFORMING PROCESS FOR REMOVAL MEDIUM

BACKGROUND

The present invention relates to mechanisms for performing a process for a removable medium. Particularly, the present invention relates to mechanisms for performing a process for a removable medium in a drive for driving the removable medium.

In a drive using a removable medium such as a tape medium, when an error of writing of data on a medium or reading out of data from a medium occurs, it is not easy to judge whether the error occurs due to the drive or the medium. A conceivable reason thereof is that the occurrence tendency of errors varies depending on combinations of a drive and a medium. Further, even with a combination of the same drive and medium, the occurrence tendency of errors may vary depending on a type of an executed operation or an environment of the drive at the time of execution.

In view of this, in order to check over the occurrence tendency of errors, some type of tape drive stores information of error histories of each cartridge which the drive has used recently in a nonvolatile memory in the drive, which error histories are at the time of the use when the drive used each cartridge. In the present specification, the information of error histories related to this drive is referred to as "drive error information". Further, in a cartridge of the tape drive, information of error histories at the time of use of the cartridge is recorded and stored in a tape medium in the cartridge for each drive that has used the cartridge recently. In the present specification, information of error histories related to this cartridge is referred to as "cartridge error information." When a cartridge is loaded in a drive, cartridge error information is read out from a tape medium in the cartridge into a random access memory (RAM) in the drive so as to be referred to or updated by firmware of the drive. Then, when the cartridge is unloaded from the drive, the cartridge error information is written back into the tape medium in the cartridge from the RAM it the drive.

For example, in a case where an error occurs when a cartridge Ca is used in a drive Da, the drive Da can know an error rate at the time of use of the cartridge Ca from its drive error information. As a result, if a mean value of error rates about the cartridge Ca is higher than mean values of error rates about all cartridges, it can be judged that a combination of the drive Da with the cartridge Ca is bad.

However, it is difficult to judge by merely drive error information of the drive Da whether errors have occurred because of poor quality of the drive, error have occurred because of poor quality of the cartridge, or errors have accidentally occurred at that time because of another factor.

Here, if pieces of drive error information of other drives Db and Dc and pieces of cartridge error information of others cartridge Cb and Cc can be obtained, the number of parameters of data to be used for judgment will increase. As a result, it is possible to judge more accurately which is more likely to have poor quality, the drive or the cartridge.

Conventionally, in order to generally judge an error factor based on pieces of error information held by a plurality of drives or a plurality of media, special software prepared outside those drives or a structure for collecting pieces of error information of a library using those drives are used.

Further, as well as the judgment of the error factor, in a case where judgment on errors such as judgment on an area on a medium where errors are easy to occur, a recovery method at the time when an error occurs, and the like is performed based on pieces of error information held by a plurality of drives or a plurality of media, special software provided outside, the drives or a structure for collecting pieces of error information of a library have been used.

Note that it has been known that a library collects information from each drive, as a technique disclosed patent application publications (for example, see Patent Documents 1 and 2).

In the technique of Patent Document 1, a library includes MIN which is connected to CAS and DEE of an import/export apparatus, DM of a recording/playback apparatus, and ADR, AMC, and CSV of a control apparatus so as to collect trace information of each MPU provided in each of them and to store the trace information in a trace information storage apparatus.

In the technique of Patent Document 2, a memory-information reading processing section of a magnetic tape library apparatus reads information related to reading of data or writing of data which the magnetic tape drive apparatus has performed on a magnetic tape cartridge, from a memory of the magnetic tape cartridge which includes an electromagnetic tape, and a maintenance/replacement judging section performs judgment on maintenance or replacement of the magnetic tape drive apparatus based on the information thus read.

[Patent Document 1]
Japanese Unexamined Patent Publication No. 11-224450
[Patent Document 2]
Japanese Unexamined Patent Publication No. 2006-164445

SUMMARY

An illustrative embodiment provides an apparatus, in a first drive for driving a removable medium, for performing a process for the removable medium, which apparatus includes: a drive interface in the first drive configured to communicate with one or more other drives and a controller. The controller is configured to receive, from the one or more other drives via the drive interface, pieces of error information about errors that had occurred in the one or more other drives; determining whether an error occurring in a particular removable medium driven by the first drive is attributable to the first drive or to the particular removable medium based on the pieces of error information received from the at least one other drive; and generating an error report for the particular removable medium based on a result of the determination.

Further, yet another illustrative embodiment provides a system including a plurality of drives each for driving a removable medium, wherein the plurality of drives are connected with each other via a communication line, and each of the plurality of drives includes: an acquisition section for acquiring error information about errors which had occurred before in the drive itself or errors which had occurred before in a removal medium; and a transmitting section for transmitting, to other drives via the communication line, the error information acquired by the acquisition section; a receiving section for receiving, via the communication line, the error information transmitted from other drives; a judging section for making a judgment on an error occurring in a particular removable medium driven by the drive itself, with the use of the error information received by the receiving section; and a processing section for performing the process for the particular removable medium based on a result of the judgment by the judging section.

Further, yet another embodiment provides a method for performing, in a first drive for driving a removable medium, a process for the removable medium, the method comprising: receiving, from other drives, pieces of error information about errors that had occurred in the one or more other drives; determining whether an error occurring in a particular removable medium driven by the first drive is attributable to the first drive or to the particular removable medium based on the pieces of error information received from the one or more other drives; and generating an error report for the particular removable medium based on a result of the determination.

Furthermore, still another embodiment provides a computer program product for causing a computer to function as an apparatus, in a first drive for driving a removable medium, for performing a process for the removable medium, the computer program product comprising a computer readable storage medium having a computer readable program stored therein, wherein the computer readable program, when executed on a computing device, causes the computing device to: receive, from other drives, pieces of error information about errors that had occurred in the one or more other drives; determine whether an error occurring in a particular removable medium driven by the first drive is attributable to the first drive or to the particular removable medium based on the pieces of error information received, from the one or more other drives; and generating an error report for the particular removable medium based on a result of the determination.

BRIEF DESCRIPTION OF THE SEVERAL VIEWS OF THE DRAWINGS

FIGS. 1A-1C are views to explain judging an error factor in accordance with an example embodiment;

FIGS. 2A and 2B are vies to explain judging an error factor in accordance with an example embodiment;

DETAILED DESCRIPTION

Figure 3:
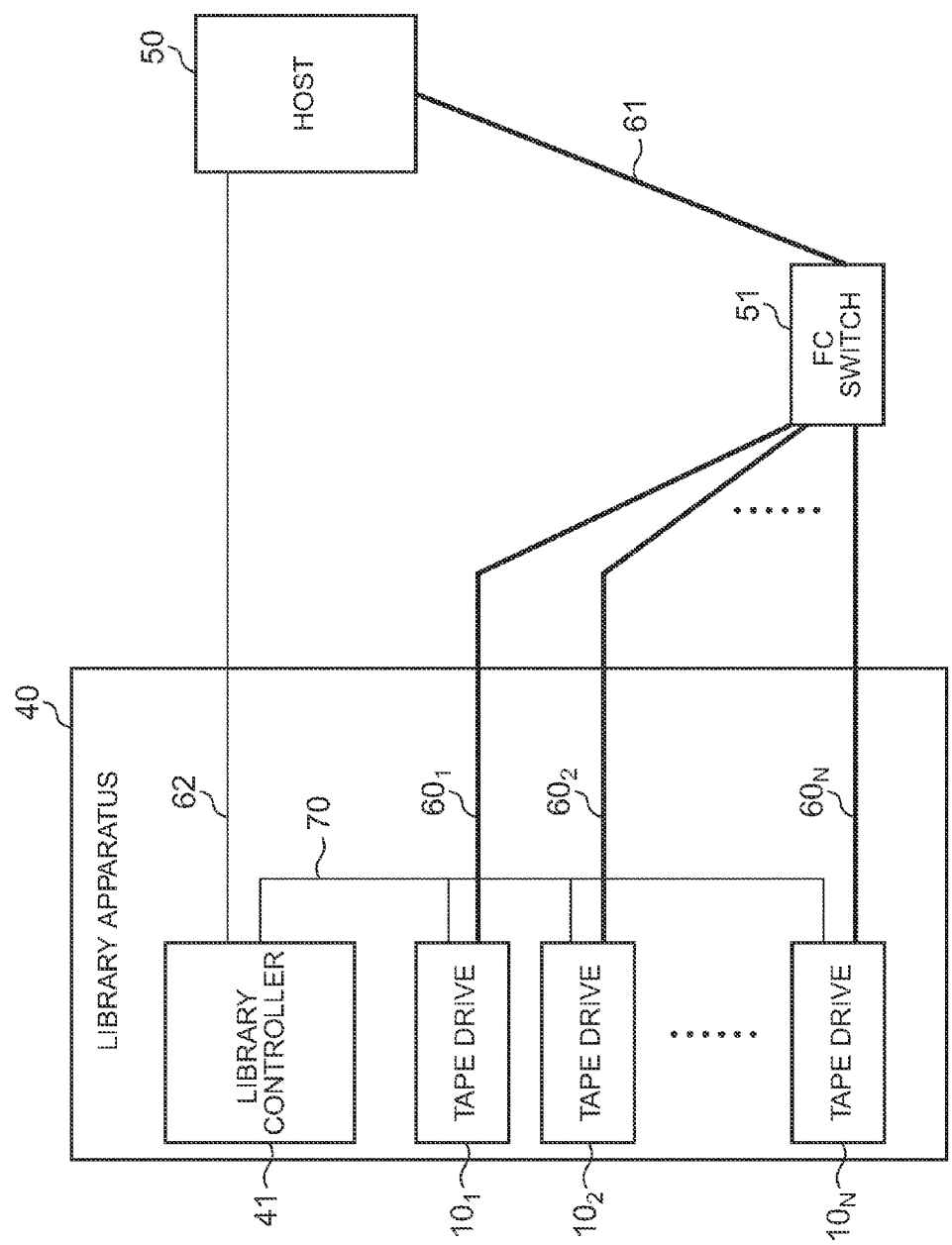
FIG. 3 is a block diagram illustrating an exemplary configuration of a library system in accordance with an illustrative embodiment.

Hereinafter, with reference to attached drawings, an embodiment of the present invention is described in detail.

First of all, in one example embodiment, drive error information and cartridge error information each retain 100 histories, and each of the histories includes values of 30 or more types of counters recorded therein.

Various methods are considered as a method for estimating an error factor with the use of these counters.

The following describes a difference between a case where an error factor is estimated only by using drive error information and cartridge error information retained by one drive and a case where an error factor is estimated by using pieces of drive error information and pieces of cartridge error information retained by a plurality of drives, by taking as an example a technique using a mean value, which is one of the simplest and easiest techniques.

Note that, in the following description, in order to simplify the point of view of this technique, it is assumed that drive error information and cartridge error information each retain ten histories.

Further, counters recorded in drive error information and cartridge error information are simplified, so that there are only four counters as follows: the number of errors of reading (the number of readout errors); the number of errors of writing (the number of writing errors); the number of data sets which are read out (the number of readout data sets); and the number of data sets which are written (the number of written data sets). Here, a data set is a logically smallest unit when data is recorded in a tape, and the size thereof may fixed to approximately 1.6 MB, for example.

First, the following describes a case where drive error information and cartridge error information which one drive has are used.

Herein, assume a small-sized library including three drives Da, Db, and Dc and fifteen cartridges Ca, Cb, Cc, . . . , Co.

Now, supposing that the cartridge Ca is loaded in the drive Da and an error occurs while the drive Da writes data in the cartridge Ca, it is judged whether the error is attributable to the drive or the medium.

For example, it is assumed that the present situation of the drive Da is one as shown in FIG. 1A, drive error information of the drive Da is one as shown in FIG. 1B, and cartridge error information of the cartridge Ca is one as shown in FIG. 1C.

Note that, in FIGS. 1A-1C, the table cells surrounded by thick lines indicate values calculated from a current error counting, a counter of the drive error information of the drive Da, and a counter of the cartridge error information of the cartridge Ca.

Further, among columns of the "number of errors," a value shown in a "Read" column indicates the number of readout errors, and a value shown in a "Write" column indicates the number of writing errors. In the meantime, among columns of the "number of data sets," a value shown in a "Read" column indicates the number of readout data sets, and a value shown a "Write" column indicates the number of written data sets. Further, among columns of the "number of data sets between errors," a value shown in a "Read" column is referred to as the number of readout data sets between errors, and a value shown in a "Write" column is referred to as the number of written data sets between errors. Here, the "number of readout data sets between errors" means the "number of readout data sets per single error," and the "number of written data sets between errors" means the "number of written data sets per single error."

The number of written data sets between errors of FIG. 1A is smaller than mean values (shown in the bottom columns) of the numbers of written data sets between errors of FIG. 1B and FIG. 1C, and thus it is found that the present situation of the drive Da is bad. However, it is only data of the drive Da and data of the cartridge Ca that are used herein, and without comparing with pieces of data of other drives or cartridges, it cannot be said that the drive Da has poor quality.

That is, it is difficult to judge whether errors have occurred because the cartridge Ca is used in the drive Da, or errors have accidentally occurred several times due to other factors.

Subsequently, the following describes a case where pieces of drive error information and pieces of cartridge error information, which a plurality of drives have, are used.

In a case where pieces of drive error information and pieces of cartridge error information are collected from a plurality of drives, the mean value of drive error information as shown in FIG. 1B can be found about other drives.

It is assumed that respective mean values of the numbers of written data sets between errors, collected from the drives Da, Db, and Dc, are as shown in FIG. 2A.

Further, it is assumed that the cartridges Ca, Cb, and Cc are used respectively in the drives Da, Db, and Dc, and mean values of the numbers of written data sets between errors in the respective cartridges, collected from the respective drives Da, Db, and Dc, are as shown in FIG. 2B.

In this case, the number of written data sets between errors in the drive Da is smaller than those of the drives Db and Dc, whereas there is no large difference found between the respective numbers of written data sets between errors in the cartridges Ca, Cb, and Cc. From this, it can be estimated that errors have occurred due to poor quality of the drive Da. For example, in a case where a difference between the number of written data sets between errors in the drive Da and the mean value of the respective numbers of written data sets between errors in the drives Da, Db, and Dc exceeds a predetermined threshold value, but a difference between the number of written data sets between errors in the cartridge Ca and the mean value of the respective numbers of written data sets between errors in the cartridges Ca, Cb, and Cc does not exceed a predetermined threshold value, it may be judged that the drive Da has poor quality. If this is viewed more widely, it may be said that it is judged whether errors are attributable to the drive Da or the cartridge Ca by comparing an error occurrence situation to be obtained from error information of the drive Da and pieces of error information of the drives Db and Dc, with an error occurrence situation to be obtained from error information of the cartridge Ca and pieces of error information of the cartridges Cb and Cc.

Thus, with the use of a plurality of pieces of error information, it is possible to estimate the factor of an error with higher accuracy.

Note that this explanation shows a method using simple mean values of error rates as a very simple example. In a case where many cartridges and drives are used under substantially uniform terms of use for a long time, such a method using mean values can arrive at a sufficiently effective result. However, in practice, it is desirable to adopt a more effective analytical method which takes into consideration used hours of each drive and preference of a cartridge used by each drive.

Further, the present embodiment does not relate to a method for estimating an error factor by using a plurality of pieces of drive error information and cartridge error information with higher accuracy than a method of estimating an error factor by using only drive error information and cartridge error information of a single drive, but relates to a method for collecting a plurality of pieces of drive error information and cartridge error information, on the premise of the above method. In view of this, about the effects obtained by using a plurality of pieces of drive error information and cartridge error information, only a simple example is given.

Incidentally, example methods which have been considered as a method for collecting pieces of error information from a plurality of drives so far include: a method in which a library using drives collects error information from each of the drive; and a method in which a program executed in an external server attached to a host collects error information from each drive.

However, since the former method premises that the library includes a function to collect error information, the method cannot be employed in those libraries manufactured by other companies which do not include such a function or drives which are not provided in libraries. Further, in the latter method, it is necessary to use a tool which collects error inform (or the like of a drive via an external resource, e.g., a library, and analyzes the error information or the like.

Further, these methods have such a problem that levels of detail of error reports from individual drives do not increase. As a result, it is necessary to make an overall judgment about an error factor on a side of receiving an error report after receiving the error report from a drive, which makes it difficult to take action quickly in accordance with the error report.

In view of this, in the present embodiment, a drive acquires pieces of error information from other drives via a communication line. Accordingly, if the drives are connected with each other via the communication line, no library or external server is required. Further, a report method of an error factor is the same as a report method (sense data and tape alert) of errors in existing drives, so that it is not necessary to add or change an interface for a host or a library.

FIG. 3 is a block diagram illustrating an exemplary configuration of a library system in accordance with an illustrative embodiment. Note that the present invention is applicable to any removable media, but here, a tape medium (hereinafter just referred to as a "tape") is taken as an example for explanation.

As illustrated in the figure, the library system includes a library apparatus 40, a host 50, and a Fibre Channel (FC) switch 51.

The library apparatus 40 includes tape drives $10_1, 10_2, \ldots, 10_N$. When a cartridge stored in a storage cell (not shown) is taken out by an accessor (not shown) and is loaded, the tape drives $10_1, 10_2, \ldots 10_N$ perform writing of data on a tape in the cartridge or readout of data from the tape in the cartridge. Further, the tape drives $10_1, 10_2, \ldots, 10_N$ are each connected to the FC switch 51 via communication lines $60_1, 60_2, \ldots, 60_N$, and the FC switch 51 is connected to the host 50 via a communication line 61, A command and data to be written is sent to a tape drive $10_K$ from the host 50 via the communication line 61, the FC switch 51, and a communication line $60_K$, and readout data and a process result are sent from the tape drive $10_K$ to the host 50 via the communication line $60_K$, the FC switch 51, and the communication line 61 (k=1, 2, ..., N). Here, as the communication lines $60_1, 60_2, \ldots, 60_N$, and 61, Fibre Channel may be used. Note that in the present specification, when the tape drives $10_1, 10_2, \ldots, 10_N$ are not distinguished from each other, they are expressed as a tape drive 10, and when the communication lines $60_1, 60_2, \ldots, 60_N$ are not distinguished from each other, they are expressed as a communication line 60.

Further, the library apparatus 40 includes a library controller 41. The library controller 41 performs a process of managing each tape drive 10, for example, a process of updating firmware to be used in each tape drive 10, a process of setting time of each tape drive 10 and the like process. Further, the library controller 41 is connected to the host 50 via a communication line 62. To the library controller 41, for example, update information of the firmware to be used in each tape drive 10, information of time to be set in each tape drive 10, and the like are sent from the host 50 via the communication line 62. Here, as the communication line 62. Ethernet may be used, for example.

In addition, in the present embodiment, the library controller 41 and the tape drives $10_1, 10_2, \ldots, 10_N$ are mutually connected to each other via a communication line 70, and each tape drive 10 is adapted to be able to acquire error information from the other tape drives 10. Here, as the communication line 70, Ethernet may be used, for example.

The host 50 is a computer device which transmits to a tape drive 10 various commands for controlling an operation of the tape drive 10 and data to be written in a tape thereof and which receives from a tape drive 10 data read out from a tape and results of processing on the tape so as to perform processing thereon.

The FC switch 51 is a switch for connecting a plurality of drives having Fibre Channel interfaces to the host 50, and a communication line 60 is switched to another so that a tape drive 10 specified by the host 50 is connected to the host 50.

Figure 4:
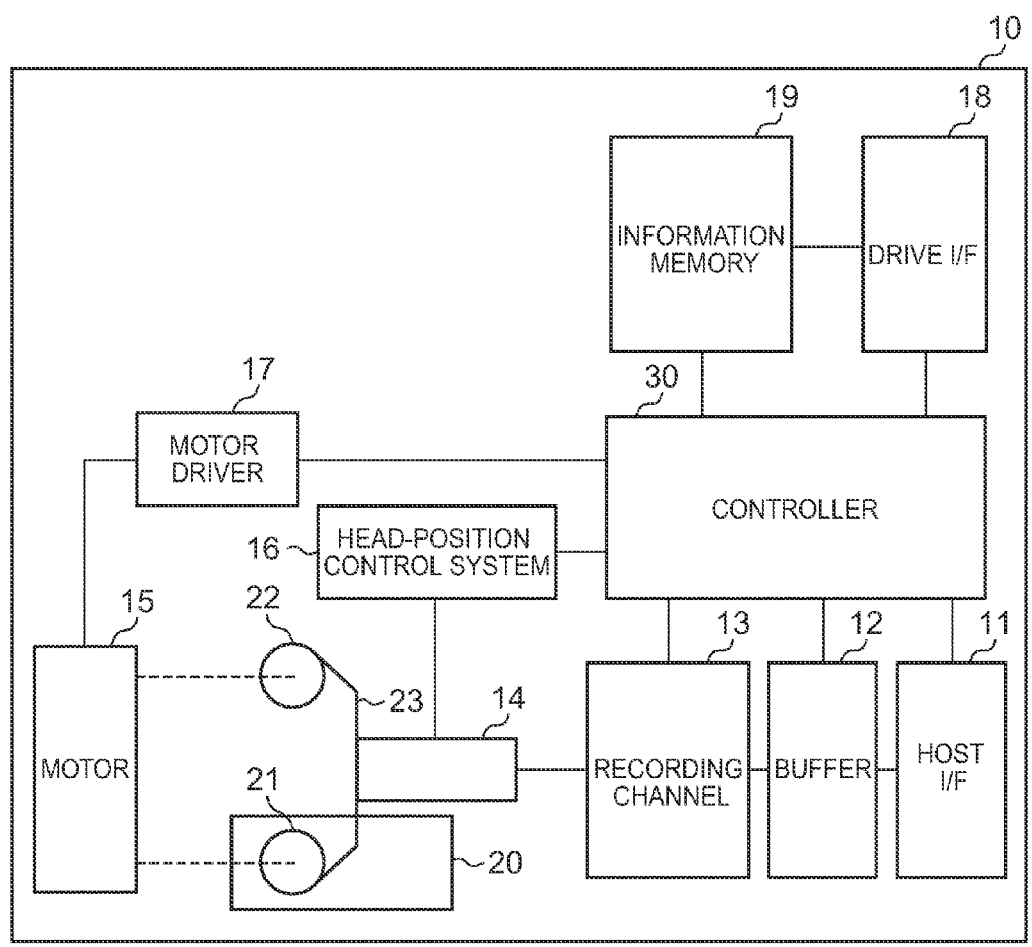
FIG. 4 is a block diagram illustrating an exemplary configuration of a tape drive in accordance with an illustrative embodiment.

FIG. 4 is a view illustrating an exemplary configuration of a tape drive 10 illustrated in FIG. 3 in accordance with an illustrative embodiment.

As illustrated in the figure, the tape drive 10 includes a host interface (hereinafter referred to as a "host I/F") 11, a buffer 12, a recording channel 13, a head 14, and a motor 15. The tape drive 10 further includes a controller 30, ahead-position control system 16, a motor driver 17, a drive interface (hereinafter referred to as a "drive I/F") 18, and an information memory 19, Further, a cartridge 20 can be loaded to the tape drive 10 by inserting therein, and therefore the cartridge 20 is also illustrated in the figure. This cartridge 20 includes a tape 23 wound around reels 21 and 22. The tape 23 longitudinally moves in a direction from the reel 21 to the reel 22 or a direction from the reel 22 to the reel 21 along with rotations of the reels 21 and 22, Note that a magnetic tape is exemplified as the tape 23, but other tape media other than magnetic tape may be usable.

The host I/F 11 communicates with the host 50, which is an example of a higher-level apparatus, via the communication line 60, the FC switch 51, and the communication line 61. The host I/F 11 receives from the host 50, for example, a command for writing data on the tape 23, a command for moving the tape 23 to an intended position, a command for reading out data from the tape 23, and a command (a synchronizing command) for forcibly writing data accumulated in the buffer 12 on the tape 23. Note that the communication standards used by the host I/F 11 may be, for example, small computer system interface (SCSI). In a case where SCSI is used, a first command corresponds to a write command, a second command corresponds to a Locate command or a Space command, a third command corresponds to a Read command, and a fourth command corresponds to a WriteFM non-immediate command. Further, the host IX 11 returns to the host 50 a response indicative of whether a process corresponding to such a command has succeeded or failed.

The buffer 12 is a memory for accumulating data to be written on the tape 23 or data read out from the tape 23. The buffer 12 is constituted by a DRAM (Dynamic Random Access Memory), for example. Further, the buffer 12 is constituted by a plurality of buffer segments each storing a data set, which is a unit for writing data on or reading data from the tape 23. The recording channel 13 is a communication path used for sending to the head 14 data to be written on the tape 23 or receiving from the head 14 data read out from the tape 23.

The head 14 writes information on the tape 23 or reads out information from the tape 23 when the tape 23 moves in the longitudinal direction.

The motor 15 rotates the reels 21 and 22. Note that the motor 15 is represented by one rectangular shape in the figure, but it is preferable that two motors 15 in total be provided such that one is for the reel 21 and the other one is for the reel 22.

The controller 30 controls the tape drive 10 as a whole. For example, the controller 30 controls the writing of data on the tape 23 or the readout of data from the tape 23 in accordance with a command received, by the host I/F 11. Further, the controller 30 also controls the head-position control system 16 and the motor driver 17. Furthermore, the controller 30 controls transmission of error information stored, in the information memory 19 to other tape drives 10, reception of pieces of error information from other tape drives 10, and execution of processes based on error information stored in the information memory 19 and pieces of error information received from other tape drives 10.

The head-position control system 16 is a system for tracking a desired one or more wraps. A "wrap" as provided herein refers to a group of a plurality of tracks on the tape 23. When it is necessary for a wrap to be changed to another one, it is also necessary for the head 14 to be electrically changed as well. Such a change is controlled by the head-position control system 16.

The motor driver 17 drives the motor 15. Note that, if two motors 15 are used as described above, two motor drivers 17 may be provided as well.

The drive I/F 18 communicates with other tape drives 10 via the communication line 70. For example, by sending a request to other tape drives 10, the drive I/F 18 receives pieces of error information stored in these other tape drives 10. Further, in response to a request from another tape drive 10, the drive I/F 18 transmits thereto error information stored in the information memory 19.

The information memory 19 is a memory for storing error information to be kept in this tape drive 10. For example, the information memory 19 is constituted by a nonvolatile memory.

Figure 5:
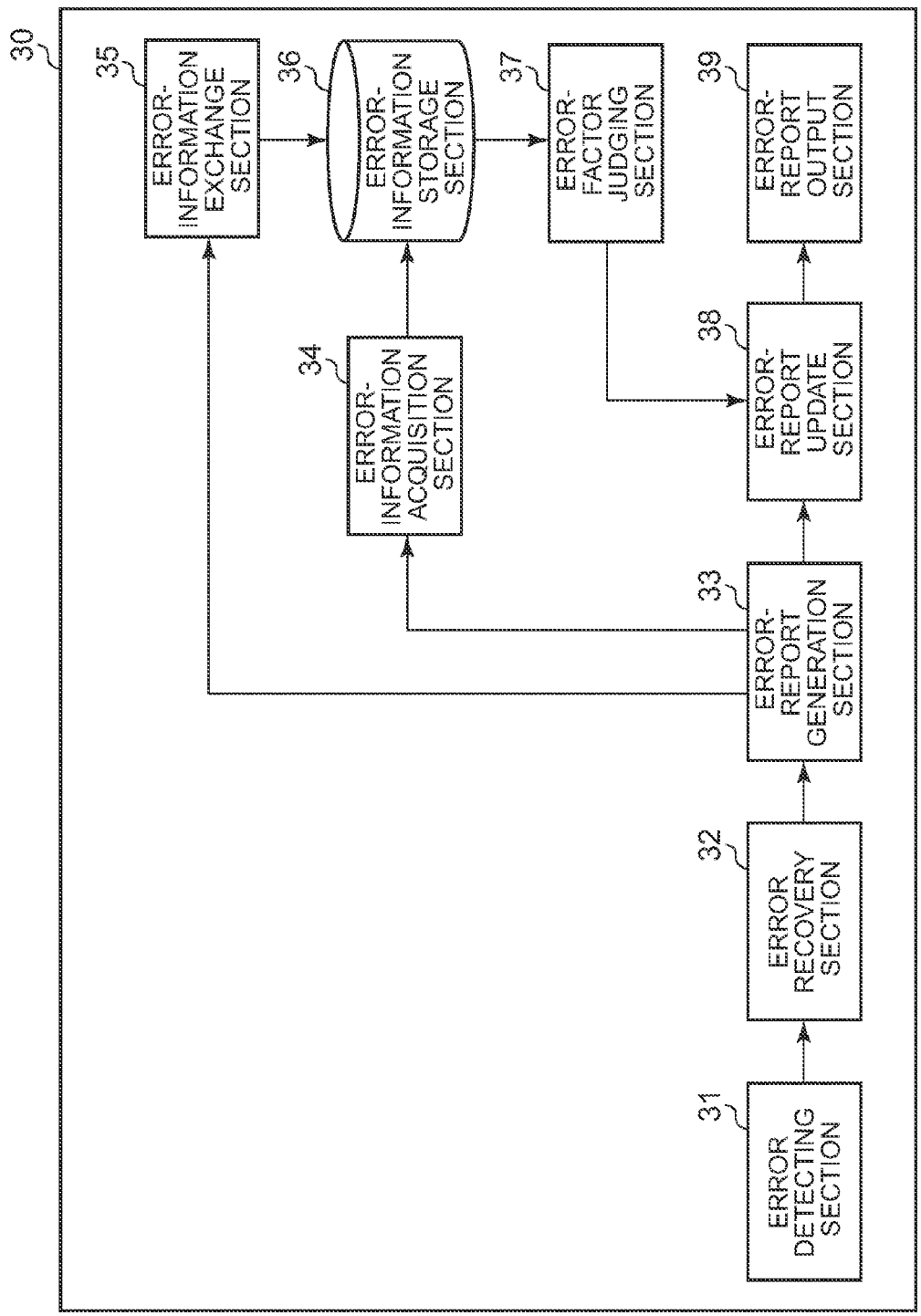
FIG. 5 is a block diagram illustrating an exemplary configuration of a function of a controller in accordance with an illustrative embodiment.

FIG. 5 is a view illustrating an exemplary configuration of a function of the controller 30 illustrated in FIG. 4 in accordance with an illustrative embodiment.

As illustrated in the figure, the controller 30 includes an error detecting section 31, an error recovery section 32, and an error-report generation section 33. The controller 30 further includes an error-information acquisition section 34, an error-information exchange section 35, an error-information storage section 36, and an error-factor judging section 37. The controller 30 still further includes an error-report update section 38 and an error-report output section 39.

The error detecting section 31 detects an error occurring at the time when data is written on the tape 23 or read out from the tape 23.

The error recovery section 32 performs an error recovery procedure on the error detected by the error detecting section 31, and if the error is not recovered, the error recovery section 32 passes the control to the error-report generation section 33. In the present embodiment, the error recovery section 32 is provided as an example of a recovery section for recovering errors.

In a case where the error is not recovered even after the error recovery section 32 performs the error recovery procedure, the error-report generation section 33 generates an error report so as to report a content of the error to the host 50. In the present embodiment, an error report is used as an example of a message for reporting that an error has occurred, and the error-report generation section 33 is provided as an example of a generation section for generating the message.

The error-information acquisition section 34 acquires error information from the information memory 19, and stores the error information in the error-information storage section 36. Here, the error information acquired by the error-information acquisition section 34 includes: drive error information on errors that had occurred before in this tape drive 10; and cartridge error information on errors that had occurred before in the tape 23 within the cartridge 20 loaded in the tape drive 10. In the present embodiment, the drive error information on the tape drive 10 is used as an example of first error information, and the cartridge error information on the cartridge 20 loaded in the tape drive 10 is used as an example of second error information. Further, the error-information acquisition section 34 is provided as an example of an acquisition section for acquiring error information, and an acquisition section for acquiring the first error information and the second error information.

The error-information exchange section 35 outputs IP addresses and acquisition requests to the drive I/F 18 so that acquisition requests of error information are transmitted to other tape drives 10 having predetermined IP addresses. Further, the error-information exchange section 35 acquires pieces of error information received by the drive I/F 18 from those other tape drives 10 and stores the pieces of error information in the error-information storage section 36. Here, the pieces of error information acquired by the error-information exchange section 35 include: pieces of drive error information on errors that had occurred before in other tape drives 10; and pieces of cartridge error information on errors that had occurred before in tapes 23 within cartridges 20 loaded in those other tape drives 10. Further, when the drive I/F 18 receives an acquisition request of error information from another tape drive 10, the error-information exchange section 35 outputs error information stored in the information memory 19 to the drive I/F 18 so that the error information is transmitted to the another tape drive 10. In the present embodiment, the pieces of drive error information on other tape drives 10 are used as an example of third error information, and the pieces of cartridge error information on the cartridges 20 loaded in those other tape drives 10 are used as an example of fourth error information. Further, the error-information exchange section 35 is provided as an example of a receiving section for receiving error information, a receiving section for receiving the third error information and the fourth error information, and a transmitting section for transmitting error information.

The error-information storage section 36 stores drive error information and cartridge error information acquired by the error-information acquisition section 31 from the information memory 19, and pieces of drive error information and cartridge error information acquired by the error-information exchange section 35 from other tape drives 10.

The error-factor judging section 37 judges the factor of an error based on a plurality of pieces of drive error information and a plurality of pieces of cartridge error information stored in the error-information storage section 36. More specifically, the error-factor judging section 37 judges whether the error is attributable to the tape drive 10 or the tape 23 in the cartridge 20 loaded in this tap drive 10. In the present embodiment, the error-factor judging section 37 is provided as an example of a judging section for making a judgment on errors, and a judging section for judging whether an error that has occurred in a particular removable medium is attributable to its own drive or the particular removable medium.

The error-report update section 38 updates an error report generated by the error-report generation section 33 with information indicative of an error factor judged by the error-factor judging section 37. More specifically, the error-report update section 38 adds to the error report, information indicative of whether the error is attributable to the tape drive 10 or the tape 23 in the cartridge 20 loaded in this tape drive 10. In the present embodiment, the error-report update section 38 is provided as an example of a processing section for performing a process for a particular removable medium, and an addition section for adding, to a message, information indicative of whether an error is attributable to its own drive or a particular removable medium.

The error-report output section 39 outputs an error report to the host I/F 11 so that the error report updated by the error-report update section 38 is transmitted to the host 50. In the present embodiment, the error-report output section 39 is provided as an example of a transmitting section for transmitting a message to a higher-level apparatus.

Figure 6:
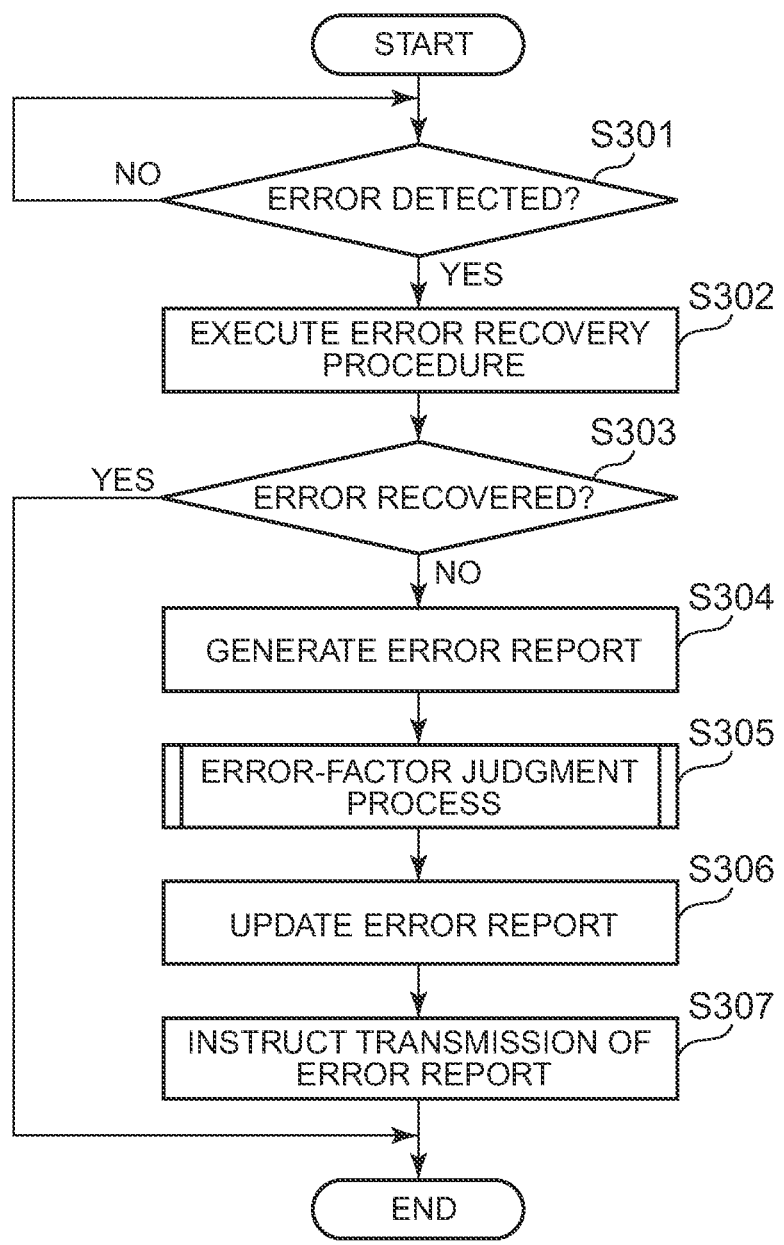
FIG. 6 is a flowchart showing an exemplary operation of a controller in accordance with an illustrative embodiment.

FIG. 6 is a flowchart showing an exemplary operation of the controller 30 illustrated in FIG. 5 in accordance with an illustrative embodiment.

As shown in the figure, in the controller 30, the error detecting section 31 initially judges whether or not an error has been detected when data is written on the tape 23 or data is read out from the tape 23, for example, based on information obtained from the recording channel 13 (Step 301). Here, if it is judged that no error has been detected, the process of Step 301 is repeated, and if it is judged that an error has been detected, the error recovery section 32 performs an error recovery procedure to recover the error (Step 302).

Then, the error recovery section 32 judges whether or not the error has been recovered (Step 303).

If it is judged that the error has been recovered as a result thereof, it is not necessary to transmit an error report to the host 50, and accordingly the process is just finished.

On the other hand, if it is judged that the error has not been recovered, the following steps are performed to transmit an error report to the host 50.

That is, the error-report generation section 33 initially generates a conventional error report to report the occurrence of the error to the host 50 (Step 304).

Then, the error-information acquisition section 34, the error-information exchange section 35, and the error-factor judging section 37 perform an error-factor judgment process (Step 305). More specifically, a process of judging whether the error is attributable to the tape drive 10 or the tape 23 is performed.

Subsequently, when the error-factor judgment process is performed normally, the error-report update section 38 updates the error report generated by the error-report generation section 33 based on a result of the error-factor judgment process (Step 306). More specifically, the error-report update section 38 reflects the result of the error-factor judgment process on the error report generated by the error-report generation section 33. For example, the error-report update section 38 adds information indicative of poor quality of the tape drive 10 or information indicative of poor quality of the tape 23 to conventional data indicative of a content of the error, such as sense data or tape alert. Thus, by reflecting a total analysis result on the content of the error to be reported, it is possible to report highly accurate error content. This is a function that can be implemented by performing analysis using pieces of error information of other tape drives 10, within a tape drive 10 of which an error is to be reported.

After that, the error-report output section 39 outputs the error report to the host I/F 11, and instructs the host I/F 11 to transmit the error report to the host 50 (Step 307). Hereby, the error report is sent to the host 50, so that the host 50 or a user can know whether the tape drive 10 has a problem or the tape 23 has a problem based on the error report from the tape drive 10.

Figure 7:
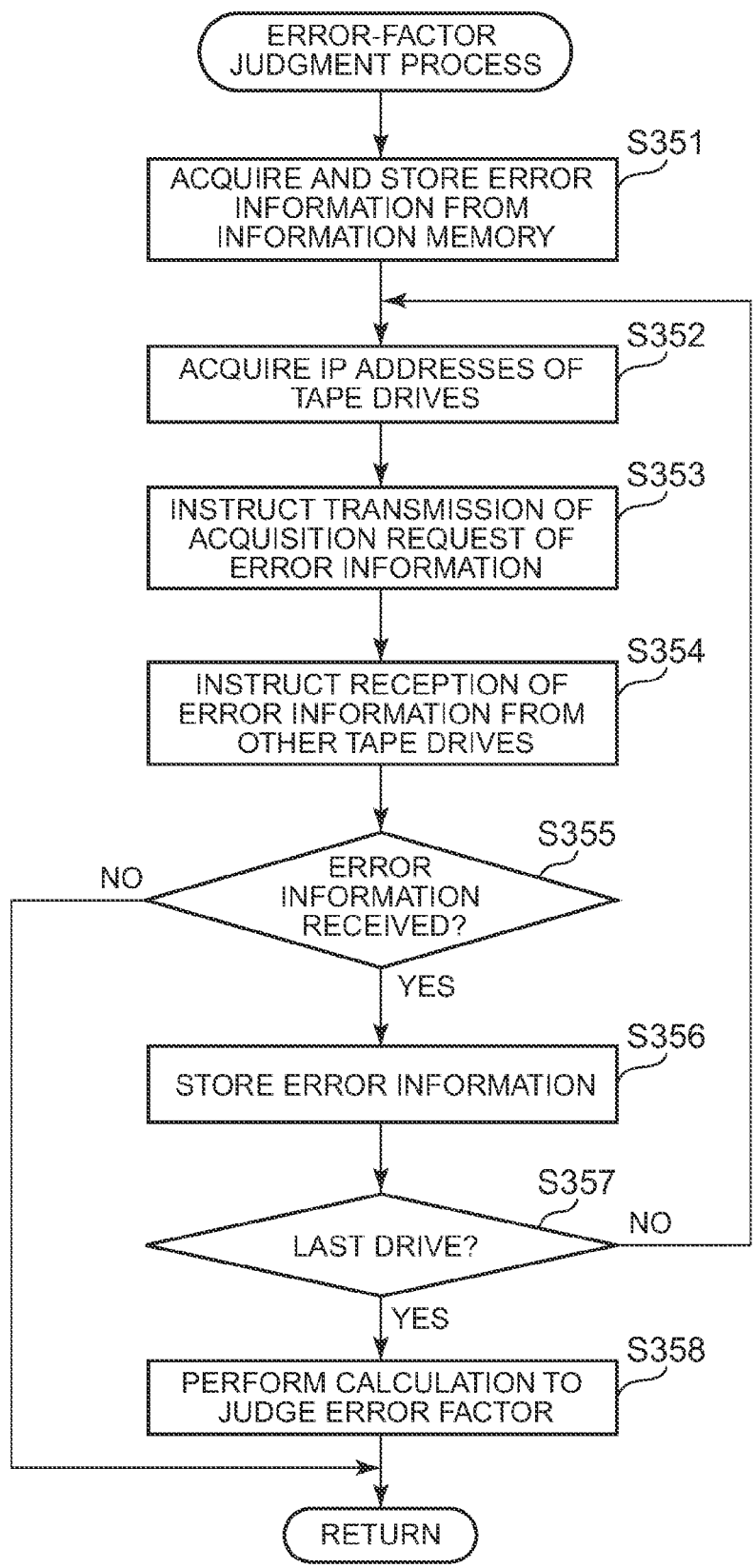
FIG. 7 is a flowchart showing a content of an error-factor judgment process executed by a controller in accordance with an illustrative embodiment.

FIG. 7 is a flowchart showing an exemplary operation of the error-factor judgment process in Step 305 of FIG. 6 in accordance with an illustrative embodiment.

In this error-factor judgment process, as shown in the figure, the error-information acquisition section 34 initially acquires drive error information and cartridge error information stored in the information memory 19 and stores them in the error-information storage section 36 (Step 351).

Then, the error-information exchange section 35 performs a process of receiving pieces of drive error information and pieces of cartridge error information kept in other tape drives 10.

That is, the error-information exchange section 35 initially acquires IP addresses of other tape drives 10 of which error information is to be exchanged (Step 352). Here, the IP addresses of those other tape drives 10 of which error information is to be exchanged are registered and stored in a nonvolatile memory (not show at the time of setup of the tape drive 10.

Then, the error-information exchange section 35 outputs an acquisition request of drive error information and cartridge error information to the drive I/F 18, and instructs the drive I/F 18 to transmit the acquisition request of these pieces of error information to tape drives 10 having the IP addresses acquired in Step 352 (Step 353). In other words, when it is necessary to transmit an error report to the host 50, the tape drive 10 requests other tape drives 10 which are registered therein in advance to send their pieces of drive error information and cartridge error information, before the tape drive 10 transmits an error report to the host 50. In each of those other tape drives 10 which have received the request, an error-information acquisition section 34 acquires drive error information and cartridge error information which the each of those other tape drives 10 stores in its information memory 19, and an error-information exchange section 35 outputs these pieces of error information to a drive I/F 18 and instructs the drive I/F 18 to transmit these pieces of error-information to the tape drive 10 as a source of the request. Thus, in those other tape drives 10, their drive I/F 18 transmit their respective pieces of drive error information and cartridge error information to the tape drive 10 as the source of the request.

On the other hand, in the tape drive 10 as the source of the request, the error-information exchange section 35 instructs the drive I/F 18 to receive the respective pieces of drive error information and cartridge error information from those other tape drives 10 (Step 354).

Then, the error-information exchange section 35 judges whether or not the drive I/F 18 has received the pieces of drive error information and cartridge error information from those other tape drives 10 (Step 355).

If it is judged that the drive I/F 18 has not received these pieces of error information as a result thereof, the process returns to the process in FIG. 6 with information indicating that the error-factor judgment process have not been performed normally being taken as a return value. On the other hand, if it is judged that the drive I/F 18 has received these pieces of error information, the error-information exchange section 35 stores these pieces of drive error information and cartridge error information in the error-information storage section 36 (Step 356).

Note that such exchange of error information may be performed with the use of a special protocol, but may be also performed with the use of existing protocols such as tftp (Trivial File Transfer Protocol).

Further, generally, an error recovery procedure is performed every ten seconds when the tape drive 10 reports an error, but time to be necessary to acquire error information is sufficiently smaller than this. Accordingly, the influence of acquisition of error information given to a performance can be ignored.

Thereafter, the error-information exchange section 35 judges whether error information has been received from a tape drive 10 having the last IP address registered in the nonvolatile memory (not shown) (Step 357). If it is judged that the error information has not been received from the tape drive 10 having the last IP address, the process returns to Step 352, but if it is judged that the error information has been received from the tape drive 10 having the last IP address, the error-factor judging section 37 performs calculation to judge an error factor (Step 358). More specifically, the error-factor judging section 37 performs, for example, calculation as explained with reference to FIG. 1A-1C and FIGS. 2A and 2B so as to judge whether the tape drive 10 has a problem or the tape 23 has a problem. That is, the error-factor judging section 37 calculates a mean value of the numbers of data sets between errors in this tape drive 10, and if this mean value is smaller than a mean value of the numbers of data sets between errors in other tape drives 10, the error-factor judging section 37 judges that this tape drive 10 has a problem. Further, the error-factor judging section 37 calculates a mean value of the numbers of data sets between errors in the tape 23 used in this tape drive 10, and if this mean value is smaller than a mean value of the numbers of data sets between errors in other tapes 23, the error-factor judging section 37 judges that the tape 23 used in this tape drive 10 has a problem.

Thus, in the present embodiment, the tape drive 10 itself is configured to acquire pieces of drive error information and cartridge error information from other tape drives 10 and to judge an error factor with the use of these pieces of error information. That is, the tape drive 10 of which an error factor is judged is configured such that, at a point when it is necessary to judge the error factor, the tape drive 10 sends a request of drive error information and cartridge error information to a plurality of tape drives 10 to which the above tape drive 10 is connected, and acquires pieces of drive error information and cartridge error information held in those tape drives 10 at that point.

This makes it possible to judge an error factor with higher accuracy with the use of a plurality of pieces of drive error information and a plurality of pieces of cartridge error information, only by using a function of the tape drive 10 without preparing functions of special software and a library outside the tap drive 10.

Further, conventionally, the tape drive 10 transmits an error report to an external server or the like so that the external server or the like makes a total judgment by collecting and analyzing a content of the error report. In contrast, in the present embodiment, at a point when the tape drive 10 transmits an error report, it is possible to report a more accurate error content with the use of pieces of error information from other tape drives 10.

Furthermore, in the present embodiment, since data is directly exchanged between tape drives 10, no change is required in an interface for the outside of each tape drive 10, including currently-used hosts 50 and libraries.

The above explanation deals with a case where the error-information exchange section 35 exchanges drive error information and cartridge error information as error information, but the present invention is not limited to this. Instead of the drive error information and cartridge error information, error information called a "tape map" may be exchanged.

Here, a tape map is a map in which a whole area on a tape 23 is divided into small partitions with wraps and regions so as to successively record what kind of error has occurred in each of the partitions. The tape map is one of constituents of a "dump file" output by the tape drive 10. Further, information of the tape map is accumulated in a memory in the tape drive 10, but not recorded in the tape 23.

Note that a wrap is a one-way path running from one end of a tape 23 to the other end thereof in a linear tape drive for recording data by reciprocating on the tape 23 many times. For example, a tape in which data is recorded by reciprocating 40 times has 80 wraps.

Further, a region is one partition obtained by dividing one wrap into small pieces.

In a case where one wrap is divided into 128 regions in the above exemplified tape, 80×128 partitions can be defined on the tape. Thus, from a wrap number and a region number, a physical position of each partition on the tape 23 can be calculated.

Now, it is conceivable that information of a tape map is cleared at a point when another cartridge 20 is loaded, but here, it is assumed that a cartridge number and a combination of a wrap and a region where a temporary error or a permanent error has occurred are recorded in a memory of the tape drive 10. In this case, a cartridge number, an error type, a wrap number, a region number, a recovery method and the like may be conceivable as data to be recorded. Among them, for example, an FSC (Failure Symptom Code) in the tape drive 10 may be preferably used as the error type, and an ERP (Error Recovery Procedure) method number may be preferably used as the recovery method. Note that when the recovery method is expressed as "Unavailable," it is taken that the error has not been able to be recovered, that is, it is taken that a permanent error has occurred.

Further, in data to be recorded in a memory of such a tape drive 10, it is possible to record, per single cartridge number, several pieces of information in which the error type, the wrap number, the region number, the recovery method, and the like are associated with each other.

Herein, this information is referred to as TMEI (Tape Map Error Information). In a case where an error occurs in a given tape drive 10 when a given cartridge 20 is used, the given tape drive 10 inquires other tape drives 10 about whether they have TMEI of the given cartridge 20 or not. Then, if these other tape drivers 10 have TMEI of the cartridge 20, they send their respective pieces of TMEI to the given tape drive 10 as a source of the request. Hereby, the given tape drive 10 as the source of the request refers to the pieces TMEI received from those other tape drives 10, and if some of the pieces of TMEI suggest the occurrence of errors in the same partition, it is judged that there are some defects in that partition of the tape 23 in this cartridge 20. More generally speaking, assume a case where, among a plurality of pieces of area information (for example, wrap numbers and region numbers in a plurality of pieces of TMEI), given number of pieces of area information which satisfies a predetermined standard (for example, the number exceeding a predetermined ratio) indicate a particular area. In this case, a judging section (not shown) judges that the particular area is an area which may have a defect.

In a case where there is only information of a single tape drive 10, even if an error has occurred in a particular partition, the possibility that the error is attributable to the tape drive 10 cannot be removed. In contrast, when it is checked that errors had occurred at the same location when the tape 23 had been used in other tape drives 10, it is highly possible that the tape 23 has some sort of problem.

In such a case, an additional test is performed in that particular partition, so that a result thereof can be taken in analysis. For example, in a case where an error has occurred at the time of writing data on the tape 23 or reading data from the tape 23 and an analysis result suggests that a given area on the tape 23 might be damaged, the tape drive 10 itself attempts an access to the given area again. That is, a processing section (not show) performs a process of attempting an access to the area. This makes it possible to further improve accuracy of the analysis result.

Further, since the tape drive 10 itself can acquire pieces of error information of other tape drives 10, it is possible to predict an area where some problem may occur in advance by collecting these pieces of error information before starting its operation. In the tape drive 10, a processing section (not shown) can perform a process of reporting, to the host 50, information additionally including information indicative of a presence of an area in which the problem is likely to occur, at timing before an error occurs, for example, at a time of loading the cartridge 20. Conceivable examples of such a process include: a process of reporting, as a free space on the tape 23, a capacity thereof excluding a capacity of the area where the problem is likely to occur; and a process of reporting information to specify the area where the problem is likely to occur.

Further, with the use of TMEI, it is possible to exchange not only information on permanent errors but also information on temporary errors. Here, a temporary error is an error which has occurred once but has been able to be recovered by a recovery function of the tape drive 10. Information on temporary errors can be exchanged by association information, in TMEI, of a wrap number, a region number, and a recovery method. Consequently, it is possible to judge in advance what kind of recovery method had been effective in the area which had a problem, thereby making it possible to share this judgment result with a plurality of tape drives 10. More specifically, assume a case where, among a plurality of pieces of association information (for example, pieces of association information of a wrap number, a region number, and a recovery method in a plurality of pieces of TMEI), a given number of pieces of association information which satisfies a predetermined standard (for example, the number exceeding a predetermined ratio) are information in which a particular area and a particular recovery procedure are associated with each other. In this case, a judging section (not shown) judges that the particular recovery procedure is effective to recover errors occurring in the particular area. If an error occurs in the particular area, the processing section (not shown) performs a process of recovering the error in accordance with the particular recovery procedure.

Some error recovery procedures take time to be performed. In view of this, by finding which error recovery procedure is effective in advance, it is possible to improve an operation performance in an area where a problem may occur or to improve an occurrence rate of temporary errors.

Here, the present invention may be realized fully by hardware or fully software. Further, the present invention can be realized by both hardware and software. Furthermore, the present invention can be realized as a computer, a data-processing system, or a computer program. This computer program can be provided in such a manner that it is stored in a computer-readable medium. Here, conceivable examples of the medium include electronic, magnetic, optical, electromagnetic, infrared, or semiconductor system (apparatus or device), or a propagation medium. Further, examples of the computer-readable medium include a semiconductor, a solid state storage device, a magnetic tape, a removable computer diskette, a random-access memory (RAM), a read-only memory (ROM), a rigid magnetic disk, and an optical disk. Current examples of the optical disk include a compact disk read-only memory (CD-ROM), compact disk read/write (CD-R/W), and a DVD.

The present invention is described with the use of the embodiment as above, but the technical scope of the present invention is not limited to the above embodiment. It will be apparent to a person skilled in the art that various modifications may be made to the embodiment of the present invention or alternative embodiments may be employed without departing from the spirit and scope of the present invention.

The invention claimed is:

1. An apparatus, in a first drive for driving a removable medium, for performing a process for the removable medium, the apparatus comprising:
   a drive interface in the first drive configured to communicate with one or more other drives; and
   a controller, wherein the controller is configured to
   receive, from one or more other drives via the drive interface, pieces of error information about errors that had occurred in the at least one other drive;
   determining whether an error occurring in a particular removable medium driven by the first drive, is attributable to the first drive or to the particular removable medium based on the pieces of error information received from the at one or more other drives; and
   generating an error report for the particular removable medium based on a result of the determination.

2. The apparatus according to claim 1, wherein the controller is further configured to:
   acquire first error information indicative of a number of errors that had occurred in the first drive, and second error information indicative of a number of errors that had occurred in the particular removable medium;
   receive, as the pieces of error information, third error information indicative of a number of errors that had occurred in the one or more other drives, and fourth error information indicative of a number of errors that had occurred in other removable media driven by the one or more other drives; and
   determine whether an error that has occurred in the particular removable medium is attributable to the first drive or to the particular removable medium, by comparing an error occurrence situation obtained from the first error information and the third error information with an error occurrence situation obtained from the second error information and the fourth error information.

3. The apparatus according to claim 2, wherein the controller is further configured to:
   add information indicative of whether the error is attributable to the first drive or the particular removable medium, to a message for reporting to a higher-level apparatus that the error has occurred in the particular removable medium.

4. The apparatus according to claim 1, wherein the controller is further configured to:
   receive, as the pieces of error information, a plurality of pieces of area information indicative of areas where errors had occurred in the particular removable medium; and
   in case where, among the plurality of pieces of area information, a given number of pieces of area information that satisfies a predetermined standard indicates a particular area, determine that the particular area is an area that is likely to have a defect.

5. The apparatus according to claim 4, wherein the controller is further configured to:
   perform at least either one of the following processes: a process of attempting an access to the particular area when an error has occurred in the particular removable medium; or a process of reporting, to a higher-level apparatus, information indicative of a presence of the particular area.

6. The apparatus according to claim 1, wherein the controller is further configured to:
   receive, as the pieces of error information, a plurality of pieces of association information in which an area where an error had occurred in the particular removable medium is associated with a recovery procedure used for recovering the error; and
   in a case where, among the plurality of pieces of association information, a given number of pieces of association information that satisfies a predetermined standard is information in which a particular area is associated with a particular recovery procedure, determine that the particular recovery procedure is effective to recover errors occurring in the particular area.

7. The apparatus according to claim 6, wherein the controller is further configured to:
   responsive to an error occurring in the particular area in the particular removable medium, perform a process of recovering the error in accordance with the particular recovery procedure.

8. A system including a plurality of drives each for driving a removable medium, wherein:
   the plurality of drives are connected with each other via a communication line, and
   each of the plurality of drives includes:
   an acquisition section for acquiring error information about errors which had occurred before in the drive itself or errors which had occurred before in a removal medium;
   a transmitting section for transmitting, to other drives via the communication line, the error information acquired by the acquisition section;
   a receiving section for receiving, via the communication line, the error information transmitted from other drives;
   a judging section for making a judgment on an error occurring in a particular removable medium driven by the drive itself, with the use of the error information received by the receiving section; and
   a processing section for performing a process for the particular removable medium based on a result of the judgment by the judging section.

9. A method for performing, in a first drive for driving a removable medium, a process for the removable medium, the method comprising:
   receiving, from one or more other drives, pieces of error information about errors that had occurred in the one or more other drives;
   determining whether an error occurring in a particular removable medium driven by the first drive, is attributable to the first drive or to the particular removable medium based on the pieces of error information received from the one or more other drives; and
   generating an error report for the particular removable medium based on a result of the determination.

10. The method according to claim 9, further comprising:
   acquiring first error information indicative of a number of errors that had occurred in the first drive, and second error information indicative of a number of errors that had occurred in the particular removable medium;
   receiving, as the pieces of error information, third error information indicative of a number of errors that had occurred in the one or more other drives, and fourth error information indicative of a number of errors that had occurred in other removable media driven by the one or more other drives; and
   determining whether an error that has occurred in the particular removable medium is attributable to the first drive or to the particular removable medium, by comparing an error occurrence situation obtained from the first error information and the third error information with an error occurrence situation obtained from the second error information and the fourth error information.

11. The method according to claim 10, further comprising:
adding information indicative of whether the error is attributable to the first drive or the particular removable medium, to a message for reporting to a higher-level apparatus that the error has occurred in the particular removable medium.

12. The method according to claim 9, further comprising:
receiving, as the pieces of error information, a plurality of pieces of area information indicative of areas where errors had occurred in the particular removable medium; and
in a case where, among the plurality of pieces of area information, a given number of pieces of area information that satisfies a predetermined standard indicates a particular area, determining that the particular area is an area that is likely to have a defect.

13. The method according to claim 12, further comprising:
performing at least either one of the following processes: a process of attempting an access to the particular area when an error has occurred in the particular removable medium; or a process of reporting, to a higher-level apparatus, information indicative of a presence of the particular area.

14. The method according to claim 9, further comprising:
receiving, as the pieces of error information, a plurality of pieces of association information in which an area where an error had occurred in the particular removable medium is associated with a recovery procedure used for recovering the error; and
in a case where, among the plurality of pieces of association information, a given number of pieces of association information that satisfies a predetermined standard is information in which a particular area is associated with a particular recovery procedure, determining that the particular recovery procedure is effective to recover errors occurring in the particular area.

15. The method according to claim 14, further comprising:
responsive to an error occurring in the particular area in the particular removable medium, performing a process of recovering the error in accordance with the particular recovery procedure.

16. A computer program product for causing a computer to function as an apparatus, in a first drive for driving a removable medium, for performing a process for the removable medium, the computer program product comprising a non transitory computer readable storage medium having a computer readable program stored therein, wherein the computer readable program, when executed on a computing device, causes the computing device to:
receive, from one or more other drives, pieces of error information about errors that had occurred in the one or more other drives;
determining whether an error occurring in a particular removable medium driven by the first drive, is attributable to the first drive or to the particular removable medium based on the pieces of error information received from the one or more other drives; and
generating an error report for the particular removable medium based on a result of the determination.

17. The computer program product according to claim 16, wherein the computer readable program further causes the computing device to:
acquire first error information indicative of a number of errors that had occurred in the first drive, and second error information indicative of a number of errors that had occurred in the particular removable medium;
receive, as the pieces of error information, third error information indicative of a number of errors that had occurred in the one or more other drives, and fourth error information indicative of a number of errors that had occurred in other removable media driven by the one or more other drives; and
determine whether an error that has occurred in the particular removable medium is attributable to the first drive or to the particular removable medium, by comparing an error occurrence situation obtained from the first error information and the third error information with an error occurrence situation obtained from the second error information and the fourth error information.

18. The computer program product according to claim 17, wherein the computer readable program further causes the computing device to:
add information indicative of whether the error is attributable to the first drive or the particular removable medium, to a message for reporting to a higher-level apparatus that the error has occurred in the particular removable medium.

19. The computer program product according to claim 16, wherein the computer readable program further causes the computing device to:
receive, as the pieces of error information, a plurality of pieces of area information indicative of areas where errors had occurred in the particular removable medium; and
in a case where, among the plurality of pieces of area information, a given number of pieces of area information that satisfies a predetermined standard indicates a particular area, determine that the particular area is an area that is likely to have a defect.

20. The computer program product according to claim 19, wherein the computer readable program further causes the computing device to:
perform at least either one of the following processes: a process of attempting an access to the particular area when an error has occurred in the particular removable medium; or a process of reporting, to a higher-level apparatus, information indicative of a presence of the particular area.

21. The computer program product according to claim 16, wherein the computer readable program further causes the computing device to:
receive, as the pieces of error information, a plurality of pieces of association information in which an area where an error had occurred in the particular removable medium is associated with a recovery procedure used for recovering the error; and
in a case where, among the plurality of pieces of association information, a given number of pieces of association information that satisfies a predetermined standard is information in which a particular area is associated with a particular recovery procedure, determine that the particular recovery procedure is effective to recover errors occurring in the particular area.

22. The computer program product according to claim 21, wherein the computer readable program further causes the computing device to:
responsive to an error occurring in the particular area in the particular removable medium, perform a process of recovering the error in accordance with the particular recovery procedure.

* * * * *